(12) United States Patent
Nagai

(10) Patent No.: US 12,065,025 B2
(45) Date of Patent: Aug. 20, 2024

(54) VEHICLE BODY RESIN MEMBER, WINDOW MEMBER WITH VEHICLE BODY RESIN MEMBER, AND VEHICLE

(71) Applicant: AGC INC., Tokyo (JP)

(72) Inventor: Kuniko Nagai, Tokyo (JP)

(73) Assignee: AGC INC., Tokyo (JP)

( * ) Notice: Subject to any disclaimer, the term of this patent is extended or adjusted under 35 U.S.C. 154(b) by 320 days.

(21) Appl. No.: 17/646,726

(22) Filed: Jan. 3, 2022

(65) Prior Publication Data

US 2022/0118832 A1  Apr. 21, 2022

Related U.S. Application Data

(63) Continuation of application No. PCT/JP2020/024069, filed on Jun. 19, 2020.

(30) Foreign Application Priority Data

Jul. 8, 2019 (JP) .................................. 2019-126898

(51) Int. Cl.
*B60R 11/04* (2006.01)
*B60J 1/00* (2006.01)
(Continued)

(52) U.S. Cl.
CPC ............... *B60J 1/20* (2013.01); *B60J 1/002* (2013.01); *B60J 5/0493* (2013.01); *B60R 1/001* (2013.01); *B60R 1/006* (2013.01); *B60R 11/00* (2013.01); *B60R 11/0258* (2013.01); *B60R 11/0264* (2013.01); *B60R 11/04* (2013.01); *B60R 2011/0042* (2013.01)

(58) Field of Classification Search
CPC ...... B60J 1/02; B60J 1/002; B60J 1/20; B60R 1/00; B60R 1/001; B60R 1/04; B60R 11/00; B60R 11/04; B60R 11/0258; B60R 11/0264; B60R 2011/0026; B60R 2011/0042; B60R 2011/0043; B60R 2011/0063
USPC ........................... 296/96.11, 84.1, 96.18, 19
See application file for complete search history.

(56) References Cited

U.S. PATENT DOCUMENTS 5,525,991 A    6/1996  Nagura et al.
10,336,163 B2 * 7/2019  Sakamoto ................ B60J 3/007
(Continued)

FOREIGN PATENT DOCUMENTS

CN    1460079 A    12/2003
CN   109641793 A    4/2019
(Continued)

OTHER PUBLICATIONS

International Search Report issued Jul. 21, 2020 in PCT/JP2020/024069, filed on Jun. 19, 2020, therein, 3 pages.
(Continued)

*Primary Examiner* — Dennis H Pedder
(74) *Attorney, Agent, or Firm* — Oblon, McClelland, Maier & Neustadt, L.L.P.

(57) ABSTRACT

The present invention relates to a vehicle body-use resin member disposed on an upper portion of a window member in a vehicle. At least one in-vehicle member is mounted on the vehicle body-use resin member. The vehicle body-use resin member has a visible light transmittance of 50% or less. The visible light transmittance may be 20% or less.

19 Claims, 6 Drawing Sheets

(51) Int. Cl.
  *B60J 1/20* (2006.01)
  *B60J 5/04* (2006.01)
  *B60R 1/00* (2022.01)
  *B60R 11/00* (2006.01)
  *B60R 11/02* (2006.01)

(56) References Cited

U.S. PATENT DOCUMENTS

| | | |
|---|---|---|
| 2003/0107521 A1 | 6/2003 | Matsuura et al. |
| 2003/0112536 A1 | 6/2003 | Wachi |
| 2007/0216768 A1 | 9/2007 | Smith et al. |
| 2010/0195226 A1* | 8/2010 | Heslin ............... H04N 7/18 |
| | | 348/148 |
| 2011/0027515 A1 | 2/2011 | Melcher et al. |
| 2017/0369003 A1 | 12/2017 | Williams et al. |
| 2019/0061481 A1 | 2/2019 | Kagaya et al. |
| 2019/0061482 A1 | 2/2019 | Kikuchi et al. |
| 2019/0061641 A1 | 2/2019 | Kikuchi et al. |
| 2019/0169068 A1 | 6/2019 | Oya et al. |
| 2021/0099622 A1 | 4/2021 | Ichiki |

FOREIGN PATENT DOCUMENTS

| | | |
|---|---|---|
| EP | 3 450 230 A1 | 3/2019 |
| GB | 2 271 139 A | 4/1994 |
| JP | 1-154486 U | 10/1989 |
| JP | 6-180775 A | 6/1994 |
| JP | 7-215131 A | 8/1995 |
| JP | 2003-146134 A | 5/2003 |
| JP | 2007-269205 A | 10/2007 |
| JP | 2011-502090 A | 1/2011 |
| JP | 2015-107764 A | 6/2015 |
| JP | 2016-175447 A | 10/2016 |
| JP | 2019-15783 A | 1/2019 |
| JP | 2019-166964 A1 | 10/2019 |
| WO | WO 2017/188415 A1 | 11/2017 |

OTHER PUBLICATIONS

Extended European Search Report issued on Jul. 3, 2023 in European Patent Application No. 20836624.5, 8 pages.

* cited by examiner

VEHICLE BODY RESIN MEMBER, WINDOW MEMBER WITH VEHICLE BODY RESIN MEMBER, AND VEHICLE

TECHNICAL FIELD

The present invention relates to a vehicle body-use resin member, a window member with a vehicle body-use resin member, and a vehicle.

BACKGROUND ART

Various members such as various sensors, antenna and mirror (hereinafter, sometimes referred to as "in-vehicle members") are mounted to a vehicle. Due to, for example, advancement of a driving assistance technology, the number of types of in-vehicle members is increasing.

For various reasons according to the types, some of in-vehicle members are desired to be disposed on the inner side of a window glass, i.e., in the vehicle interior. However, of these, some in-vehicle members are difficult to be disposed in the vehicle interior.

For example, it is difficult to dispose an infrared camera in the vehicle interior, because the glass hardly transmits an infrared ray. In addition, the glass is also insufficiently transparent to radio waves at a frequency band of several GHz to several tens of GHz bands (hereinafter, sometimes referred to as "high frequency band") used in the recent communication in a fourth-generation mobile communication system (hereinafter, sometimes referred to as "4G") or a fifth-generation mobile communication system (hereinafter, sometimes referred to as "5G"). This makes it difficult to dispose an antenna in the vehicle interior as well.

In consideration of these difficulties, various efforts are being made to dispose a variety of in-vehicle members in the vehicle interior.

For example, Patent Literature 1 discloses that part of the inner glass of a laminated glass used as a window glass is replaced by a radio wave transmitting material so as to make part of a window member be a region having a high radio wave transmittance.

Patent Literature 2 discloses that a region partially lacking the inner glass is provided in a window member composed of a laminated glass to thereby enhance the transparency to electromagnetic waves.

Patent Literature 3 discloses that part of a window glass is hollowed out and a material having a high infrared transmittance is inserted thereinto to partially provide a region having a high infrared transmittance in a window member.

CITATION LIST

Patent Literature

Patent Literature 1: International Publication WO 2017/188415
Patent Literature 2: JP-T-2011-502090 (the term "JP-T" as used herein means a published Japanese translation of a PCT patent application)
Patent Literature 3: UK Unexamined Patent Publication No. 2271139

SUMMARY OF INVENTION

Solution to Problem

However, in these literatures, difficulty of working of a window member or difficulty of mounting of an in-vehicle member is not sufficiently discussed.

All of window members described in Patent Literatures 1 to 3 must be shaped to let part of a glass be cut out or hollowed out. However, the glass has low moldability and workability, and therefore, the working above requires enormous cost and manhours or the periphery of the worked portion is distorted, presenting a problem with the outer appearance or the performance of an in-vehicle member mounted.

Also, the method for mounting an in-vehicle member to a window member includes, for example, a method of providing a concave or a hole in a window member and mounting an in-vehicle member in the concave or hole. However, due to low moldability and workability of the glass, such working requires enormous cost and manhours as well. In addition, compared with the positioning accuracy required for mounting of an in-vehicle member, the working accuracy is sometimes insufficient.

Other methods for mounting an in-vehicle member to a window member include a method of bonding a bracket to a window member and mounting an in-vehicle member via the bracket. However, while the window member is in a curved-surface shape, the bonding surface of the bracket is fundamentally in a planar shape, and therefore, it is difficult to ensure the bonding area and in turn, the bonding strength. Accordingly, application of such a method is difficult when the in-vehicle member is heavy. Although it may be considered to use an adhesive having thickness and flexibility and capable of relieving the difference in the bonding surface shape such as urethane, etc., such a method causes an increase in the cost or manhours and moreover, the bonded in-vehicle member is susceptible to vibration, which may adversely affect the function of the in-vehicle member.

In addition, other methods for mounting an in-vehicle member to a window member include, for example, a method of bonding an in-vehicle member to a window member, but this method also involves the same problem as in the case of bonding a bracket.

Furthermore, in the window member described in Patent Literature 1 or 2, a region having a higher electromagnetic wave transparency than other regions is provided in the window member, but since this region includes a glass as well, the electromagnetic wave transparency is sometimes insufficient.

The present invention has been accomplished in consideration of these circumstances, and an object thereof is to provide a vehicle body-use resin member suited for mounting an in-vehicle member. Another object is to provide a vehicle body-use resin member-equipped widow member including the vehicle body-use resin member, and a vehicle.

Technical Problem

The vehicle body-use resin member of one embodiment according to the present invention for solving the problems above is a vehicle body-use resin member disposed on an upper portion of a window member in a vehicle, wherein at least one in-vehicle member is mounted.

In one embodiment of the vehicle body-use resin member of the present invention, at least one of the in-vehicle members is a sensor, and the vehicle body-use resin member may have a through hole.

In one embodiment of the vehicle body-use resin member of the present invention, at least one of the in-vehicle members is an antenna, and the vehicle body-use resin member may have a concave for mounting the antenna.

In one embodiment of the vehicle body-use resin member of the present invention, at least one of the in-vehicle members is a mirror, and the vehicle body-use resin member may have a planar portion for mounting a mirror base of the mirror.

In one embodiment of the vehicle body-use resin member of the present invention, at least one of the in-vehicle members is a mirror, and a mirror base of the mirror may be integrally molded with the vehicle body-use resin member.

In one embodiment of the vehicle body-use resin member of the present invention, the visible light transmittance may be 50% or less.

In one embodiment of the vehicle body-use resin member of the present invention, the deflection temperature under load may be 50° C. or more.

In one embodiment of the vehicle body-use resin member of the present invention, the coefficient of linear thermal expansion may be $80 \times 10^{-6}$ ° $C.^{-1}$ or less.

Also, the vehicle body-use resin member-equipped window member of one embodiment according to the present invention includes a window member and the vehicle body-use resin member of the present invention disposed on the upper portion of the window member.

In one embodiment of the vehicle body-use resin member-equipped window member of the present invention, at least one in-vehicle member mounted to the vehicle body-use resin member may further be provided.

In addition, the vehicle of one embodiment according to the present invention includes a window member and the vehicle body-use resin member of the present invention disposed on the upper portion of the window member.

In one embodiment of the vehicle of the present invention, at least one in-vehicle member mounted to the vehicle body-use resin member may further be provided.

Advantageous Effects of Invention

The vehicle body-use resin member according to one embodiment of the present invention is suited for mounting an in-vehicle member. Also, each of the vehicle body-use resin member-equipped widow member and the vehicle includes a vehicle body-use resin member suited for mounting an in-vehicle member.

DESCRIPTION OF EMBODIMENTS

Figure 1:
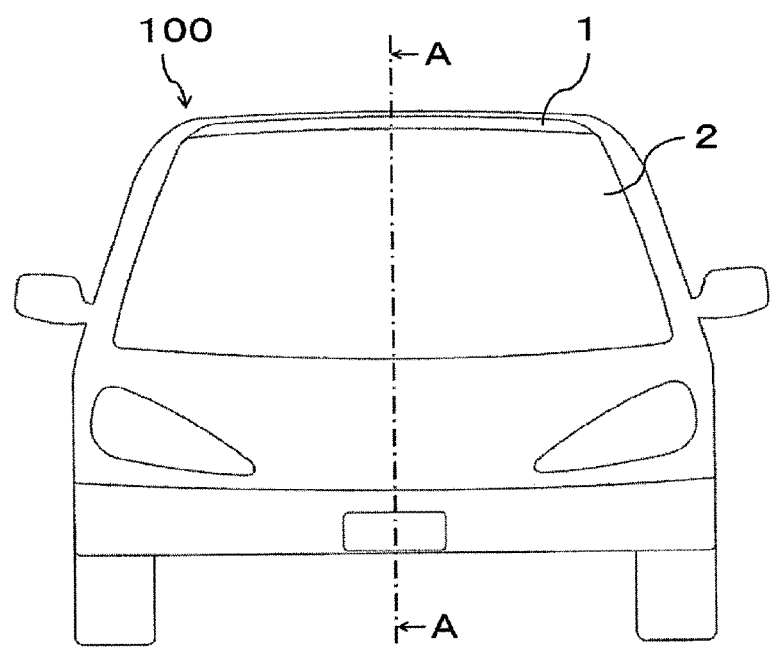
FIG. 1 is a schematic front view of a vehicle including the vehicle body-use resin member according to one embodiment of the present invention.

Embodiments of the present invention are described below. The present invention is not limited to the embodiments described below. Also, in the drawings, embodiments are schematically depicted to clearly describe the present invention and not to accurately represent the actual size or scale.

FIG. 1 displays a schematic front view of a vehicle 100 including a vehicle body-use resin member 1 according to the present embodiment. The vehicle body-use resin member 1 according to the present embodiment is disposed on the upper portion of a window member 2 in the vehicle 100, and at least one in-vehicle member is mounted thereto. The vehicle body-use resin member 1 of the present embodiment is described in detail below.

The vehicle body-use resin member according to the present embodiment is a resin member constituting a vehicle body (vehicle body-use resin member).

In the present description, the vehicle body is a concept distinguished from the window member. The window member is usually made of a laminated glass or a strengthened glass, and the passenger visually recognizes an exterior scene through the window member. The vehicle window member includes, for example, a window shield, a rear glass, and a side glass, etc. On the other hand, the vehicle body usually transmits substantially no visible light, and the passenger does not visually recognize an exterior scene through the vehicle body.

In the following, the vehicle body-use resin member is sometimes simply referred to as "resin member".

The resin member of the present embodiment is a member to which an in-vehicle member is mounted. The resin member of the present embodiment is made of a resin and because of its high moldability or workability, can easily be formed into a shape suited for mounting an in-vehicle member. The shape suited for mounting an in-vehicle member includes, for example, a shape having a concave, a hole, a projection, and a planar portion, etc. for mounting an in-vehicle member. The method for forming the resin member of the present embodiment into such a shape is not particularly limited, but in view of cost, manhours and working accuracy, such a shape is preferably formed at the time of molding. That is, the resin member of the present embodiment is preferably a resin member formed by integral molding.

The resin member of the present embodiment facilitates mounting of an in-vehicle member or since it is resin-made, hardly inhibits the function of the mounted in-vehicle member. Details are described later.

Due to these characteristic features, the resin member of the present embodiment is a member suited for mounting an in-vehicle member. Also, the resin member of the present embodiment is mounted on the upper side of the window member in a vehicle and therefore, is suited particularly for mounting an in-vehicle member that is desired to be mounted at a high position. In the following, examples of the structure of the in-vehicle member of the present embodiment are specifically described by presenting examples of the in-vehicle member to be mounted.

<Sensor>

First, a case where the in-vehicle member is a sensor is described. Here, the sensor mounted to a vehicle includes, for example, a camera such as visible light camera and infrared camera, a radar such as milli-wave radar, and LIDAR (Laser Imaging Detection and Ranging), etc.

The sensor is desired to be mounted at a relatively high position in a vehicle so as to ensure a wide sensor range. However, since the glass has a low transmittance of infrared light or milli-wave, the infrared camera, LIDAR, or milli-wave radar cannot be mounted in the vehicle interior (on the inner side of a window member). Consequently, the sensor is usually mounted inside the front grill.

On the other hand, visible light passes through the glass and therefore, the visible light camera can be mounted in the vehicle interior and is usually mounted on the inside upper portion of the window member. However, in the case where the visible light camera is mounted in this way, there is a problem that since the visible light camera detects visible light passed through the window member, the image obtained is an unclear and distorted image.

In order to solve the problem above, there may be considered a method where a through hole is provided in part of the window member and the sensor is mounted so that an electromagnetic wave passed through the through hole can be detected. However, since the window member is formed of a glass having low workability and moldability, enormous cost and manhours are required for providing such a through hole.

Furthermore, the window member is usually in a curved-surface shape and is made of a glass having low workability and therefore, there is also a problem that mounting of the sensor to the window member is highly difficult and requires enormous cost and manhours. In addition, since mounting is difficult, the sensor mounted suffers from poor stability and is readily subject to vibration during traveling of a vehicle, and this may adversely affect the function of the sensor.

An example of the resin member of the present embodiment for solving the above-described conventional problems when mounting a sensor includes a resin member having a through hole. The sensor is mounted to the resin member so that an electromagnetic wave (visible light, infrared light, and milli-wave, etc.) passed through the through hole can be detected.

The resin member of the present embodiment is made of a resin and has excellent moldability and workability and therefore, a through hole can be easily formed. Also, a sensor can be easily and stably mounted. Accordingly, when the resin member of the present embodiment is used, a sensor can be mounted at a high position easily without inhibiting the function.

The size or shape of the through hole may be appropriately adjusted according to the size or shape of a sensor member to be mounted but usually, is a circle having a diameter of approximately from 1 to 3 cm.

Figure 2:
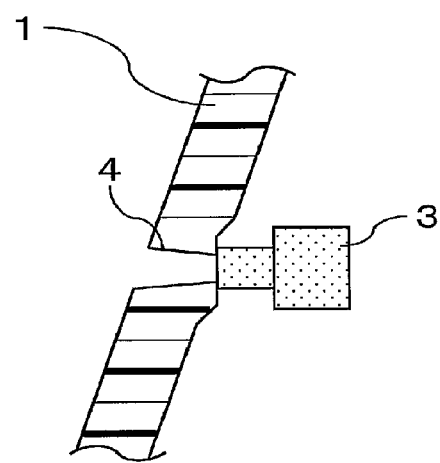
FIG. 2 is one example of the enlarged view of, in the cross-sectional view along line A-A of FIG. 1, the periphery of a region where an in-vehicle member is mounted in the vehicle body-use resin member.
Figure 3:
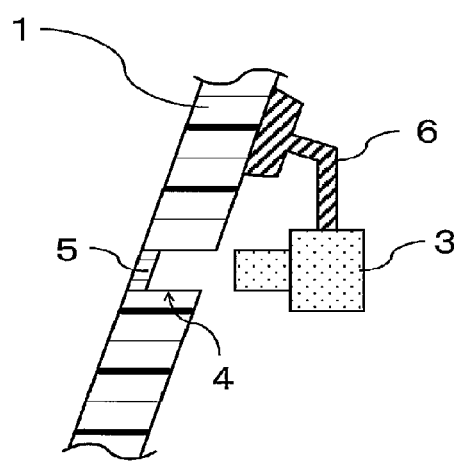
FIG. 3 is another example of the enlarged view of the periphery of, in the cross-sectional view along line A-A of FIG. 1, a region where an in-vehicle member is mounted in the vehicle body-use resin member.
Figure 4:
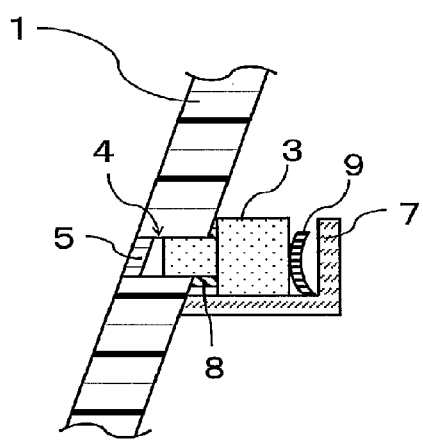
FIG. 4 is another example of the enlarged view of the periphery of, in the cross-sectional view along line A-A of FIG. 1, a region where an in-vehicle member is mounted in the vehicle body-use resin member.

The method for fixing a sensor to the resin member includes, for example, a method of inserting a sensor into the through hole, a method of bonding a sensor to the resin member, a method of pressing a sensor against the resin member, and a method of fixing a sensor by use of a bracket or a sensor box, etc. Examples of the method for fixing a sensor to the resin member are described below by referring to FIG. 2 to FIG. 4. The method of mounting a sensor to the resin member is not limited to these. FIG. 2 to FIG. 4 are enlarged views of, in the cross-sectional view along line A-A of FIG. 1, the periphery of a region where an in-vehicle member is mounted in the resin member 1. This holds true for FIG. 5 to FIG. 8.

In the example illustrated in FIG. 2, a sensor 3 is bonded to the resin member 1 and thereby fixed. When a lens portion of the sensor 3 is exposed to the vehicle exterior as in the example illustrated in FIG. 2, the lens portion is preferably protected by a cover glass, etc.

In the cover glass, the transmittance of an electromagnetic wave that the sensor 3 detects is preferably high. For example, in the case of mounting a visible light camera, the cover glass is preferably formed of a glass having a high visible light transmittance. Also, in the case of mounting an infrared camera, the cover glass is preferably formed of a glass having a high infrared transmittance. The glass having a high infrared transmittance includes, for example, a chalcogenide glass.

In such a configuration, when rain enters the inside of the through hole 4, the rain cannot be removed by a wiper. Accordingly, such a configuration preferably includes a mechanism, for example, for blowing air into the through hole so that the rain in the through hole 4 can be removed. Also, in order to prevent rain from entering the vehicle interior side from between the through hole and the sensor 3, the through hole 4 is preferably sealed by an optional member.

Instead of an adhesive, the sensor may be pressed against the resin member, for example, by a spring member and thereby fixed. In this case, from the viewpoint of sealing property, it is preferable to dispose a rubber member between the resin member and the sensor.

Next, another example illustrated in FIG. 3 is described. In the example illustrated in FIG. 3, the sensor 3 is fixed to the resin member 1 via a bracket 6. In this example, a cover glass 5 is preferably provided at the vehicle exterior-side end of the through hole 4 as illustrated in FIG. 3. In order to enhance the mounting stability of the sensor 3, it is also preferable to provide a planar portion in the resin member 1 and mount the bracket 6 thereto. In addition, integral molding of the bracket 6 and the resin member 1 is preferred as well.

Next, another example illustrated in FIG. 4 is described. In the example illustrated in FIG. 4, the sensor 3 is housed in a sensor box 7, pressed against the resin member by a spring member 9, and fixed by being inserted into a through hole 4.

The method for mounting the sensor box 7 to the resin member 1 is not particularly limited. For example, the sensor box 7 may be bonded to the resin member 1. It is also possible to provide an engagement projection in the resin member 1 and insert the projection into an engagement concave provided in the sensor box 7. The shape of the engagement projection and concave is not particularly limited and may be appropriately adjusted to a shape facilitating the mounting. In addition, the sensor box 7 may be formed by integral molding with the resin member 1.

In this example, the sensor 3 is fixed by being inserted into the through hole 4. The method for fixing the sensor 3 to the through hole 4 is not particularly limited. The method includes, for example, a method of fixing the sensor by an adhesive, a method of providing threads on the inner surface of the through hole 4 and the outer surface of the sensor 3 and screwing them together, and a method of providing, for example, a locking fixture, such as clip, on the sensor 3 and locking the sensor by the locking fixture.

The sensor 3 may be fixed, for example, by being pressed against the resin member 1 from the inside of the sensor box 7 by a spring member 9. In this case, a rubber member 8 for filling a gap created between the sensor 3 and the resin member 1 is preferably disposed.

In the case of mounting a plurality of sensors, a plurality of sensors may be housed in one sensor box. In addition, a hood, etc. covering the sensor top so as to prevent outside light from entering may be attached to the sensor.

The method for mounting a sensor to the resin member is not limited to the above-described specific examples. For example, in place of a sensor box, the sensor may be mounted by placing the sensor on a plate-like member composed of only the bottom plate of a sensor box and mounting the plate-like member to the resin member.

<Antenna>

Next, the case where the in-vehicle member is an antenna used for transmitting and receiving radio waves is described.

An antenna is desired to be mounted at a relatively high position in a vehicle so as to facilitate transmission and reception of radio waves and is mounted, for example, on the inside upper portion of the window member. However, the glass hardly transmits radio waves in a high frequency band used for recent 4G or 5G, and this makes it difficult to dispose an antenna in the vehicle interior as in the past.

On the other hand, the resin member of the present embodiment is made of a resin and, compared with the glass-made window member, it is easy to enhance the transparency to electromagnetic waves by adjusting the material or thickness, so that the resin member can also transmit radio waves in a high frequency band. Therefore, when the resin member of the present embodiment is used, an antenna can be mounted in the vehicle interior.

Figure 5:
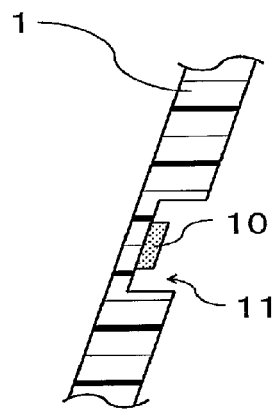
FIG. 5 is another example of the enlarged view of the periphery of, in the cross-sectional view along line A-A of FIG. 1, a region where an in-vehicle member is mounted in the vehicle body-use resin member.

The antenna can be mounted to the resin member 1, for example, by an adhesive, etc. In the case where an antenna is mounted, the resin member 1 may have a concave 11 for mounting an antenna 10 as illustrated in FIG. 5.

Figure 6:
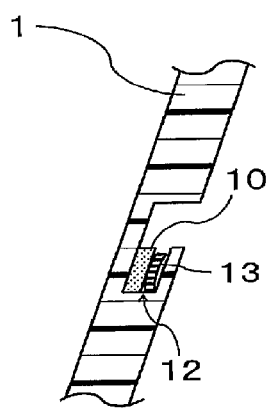
FIG. 6 is another example of the enlarged view of the periphery of, in the cross-sectional view along line A-A of FIG. 1, a region where an in-vehicle member is mounted in the vehicle body-use resin member.

For example, the antenna 10 may be mounted by being inserted into a pocket 12 provided in the resin member 1 as illustrated in FIG. 6. In order to suppress the vibration of the antenna 10 in the pocket 12, the antenna 10 is preferably fixed by being pressed against the inside of the pocket 12, for example, by a spring member 13, etc. The antenna 10 may be bonded, for example, to the inside of the pocket 12.

Furthermore, a bracket is usually used for mounting an in-vehicle member, but the bracket is made of a metal and therefore, adversely affects transmission and reception of radio waves. On the other hand, the resin member of the present embodiment is made of a resin and because of its high moldability and workability, is easily formed into a shape suited for mounting various in-vehicle members. Therefore, the number of brackets used for mounting in-vehicle members can be reduced. Thus, from this viewpoint as well, the resin member of the present embodiment is suited for mounting an antenna.

<Room Mirror>

Next, the case where the in-vehicle member is a room mirror is described.

A room mirror is usually mounted to a window member through a mirror base bonded to the window member. However, while the window member is in a curved-surface shape, the bonding surface of the mirror base is usually in a planar shape, and therefore, it is difficult to ensure the bonding strength as described above. Nevertheless, the room mirror is recently required to be multi-functionalized and since the weight of the room mirror consequently increases, a mounting structure capable of more strongly mounting the room mirror is demanded.

Figure 7:
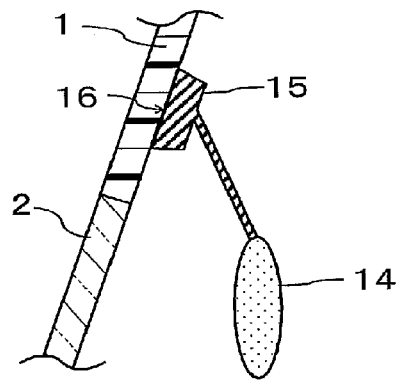
FIG. 7 is another example of the enlarged view of the periphery of, in the cross-sectional view along line A-A of FIG. 1, a region where an in-vehicle member is mounted in the vehicle body-use resin member.
Figure 8:
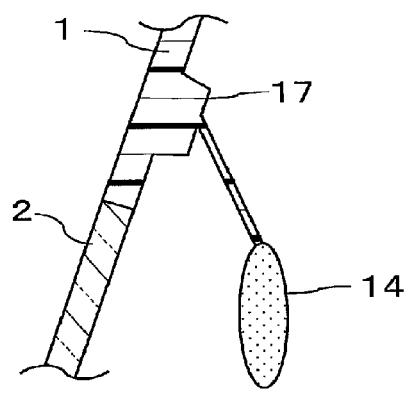
FIG. 8 is another example of the enlarged view of the periphery of, in the cross-sectional view along line A-A of FIG. 1, a region where an in-vehicle member is mounted in the vehicle body-use resin member.

In the case where a room mirror 14 is mounted, a first example of the resin member of the present embodiment for solving the above-described conventional problems is a resin member 1 having a planar portion 16 for mounting a mirror base 15 as illustrated in FIG. 7. At this time, the surface may be roughened so as to enhance the adhesiveness. Also, a second example is a resin member 1 having an integrally molded mirror base 17 as illustrated in FIG. 8.

In the resin member 1 of the first example, a mirror base 15 is mounted to the planar portion 16, and a room mirror 14 is mounted to the mirror base 15, whereby the room mirror 14 is firmly mounted. Also, in the resin member 1 of the second example, a room mirror 14 is mounted to the integrally molded mirror base 17, and the room mirror 14 is thereby firmly mounted. The method for mounting the mirror base 15 to the planar portion 16 in the first example is not particularly limited, but, for example, the mirror base can be mounted using an adhesive.

In the foregoing pages, representative in-vehicle members are recited, and examples of the resin member for mounting them are described, but the in-vehicle member mounted to the resin member of the present embodiment is not limited to those exemplified above. In addition, a plurality of in-vehicle members may be mounted to the in-vehicle member of the present embodiment.

Figure 9:
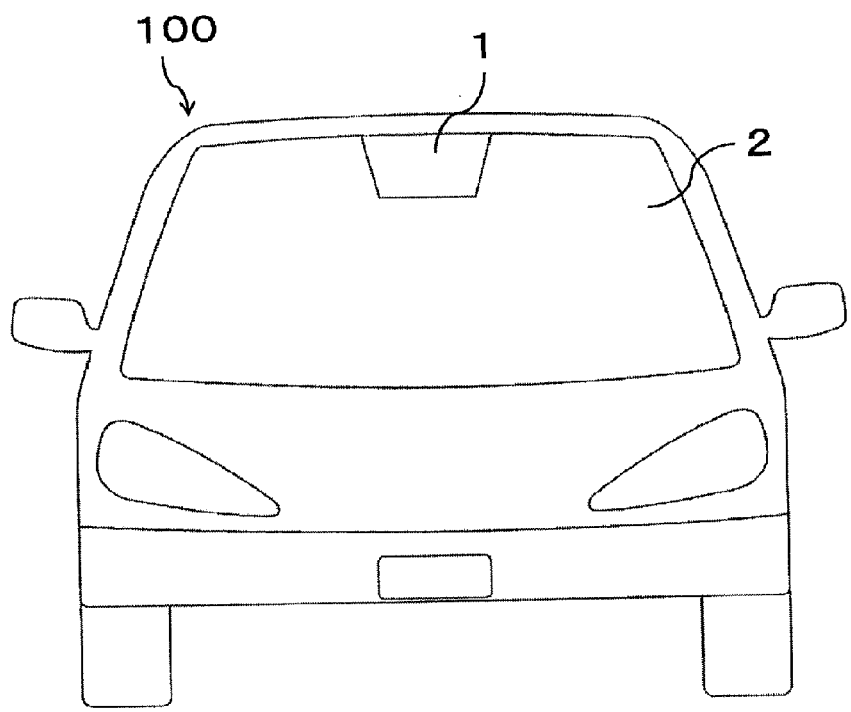
FIG. 9 is a schematic front view of a vehicle including the vehicle body-use resin member according to another embodiment of the present invention.

The shape of the resin member of the present embodiment is not particularly limited but may be, for example, a plate shape having a thickness of 2 to 30 mm. The thickness of the resin member may not be uniform and may be appropriately adjusted according to the strength required or the performance or mounting structure of a sensor, etc. to be mounted. The resin member 1 of the present embodiment may be provided, for example, throughout the width direction of the window member 2 as illustrated in FIG. 1, or may be provided partially in the width direction of the window member 2 as illustrated in FIG. 9.

The resin member of the present embodiment may be painted or may not be painted when providing it in a vehicle. In the case where the resin member of the present embodiment is provided over a wide range as in the shape illustrated in FIG. 1, for appearance reasons, the resin member is preferably painted with the same color as the vehicle body portion other than the resin member of the present embodiment.

On the other hand, in the case of being not painted, the resin member of the present embodiment is exposed directly to sunlight, outside air, rain, etc., and therefore, its weather resistance is preferably high. The weather resistance can be enhanced by coloring the resin member of the present embodiment black or incorporating a UV absorber or an antioxidant, etc. into the resin member of the present embodiment.

If the mounting structure of the in-vehicle member can be visually recognized from the outside of the vehicle, this is unfavorable in view of outer appearance. Therefore, in the case of not painting the resin member of the present embodiment, its visible light transmittance is preferably low. Specifically, the visible light transmittance is preferably 50% or less, more preferably 20% or less. Here, the visible light transmittance above means the visible light transmittance determined in conformity with the Japanese Industrial Standards (JIS R3212-2015).

Since the region where the resin member of the present embodiment is mounted is a region that is relatively likely to rise in the temperature due to sunlight, etc., the resin member of the present embodiment preferably has excellent heat resistance. Specifically, the resin member of the present embodiment preferably has a deflection temperature under load of 50° C. or more, more preferably 70° C. or more, still more preferably 90° C. or more. The deflection temperature under load above means the value measured in conformity with the Japanese Industrial Standards (JIS K7191-2-2007, 0.45 MPa).

For explaining the joined portion of the resin member and the window member, FIG. 10A to FIG. 10D depict enlarged views of, in the cross-sectional view along line A-A of FIG. 1, the periphery of a joined portion of the resin member 1 and the window member 2.

Figure 10A:
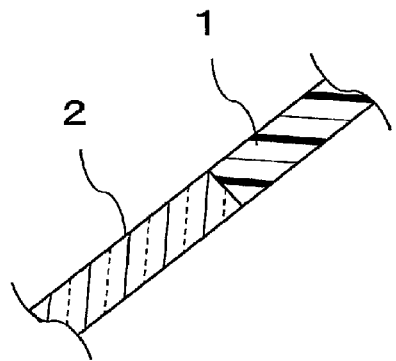
FIG. 10A is one example of the enlarged view of, in the cross-sectional view along line A-A of FIG. 1, the periphery of a joined portion of the vehicle body-use resin member and the window member.
Figure 10B:
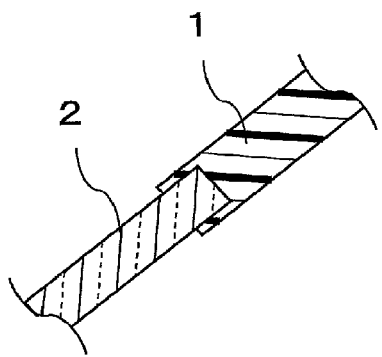
FIG. 10B is another example of the enlarged view of, in the cross-sectional view along line A-A of FIG. 1, the periphery of a joined portion of the vehicle body-use resin member and the window member.
Figure 10C:
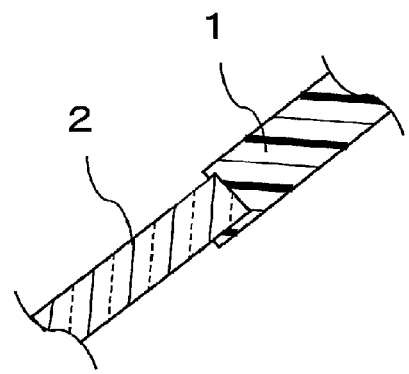
FIG. 10C is another example of the enlarged view of, in the cross-sectional view along line A-A of FIG. 1, the periphery of a joined portion of the vehicle body-use resin member and the window member.
Figure 10D:
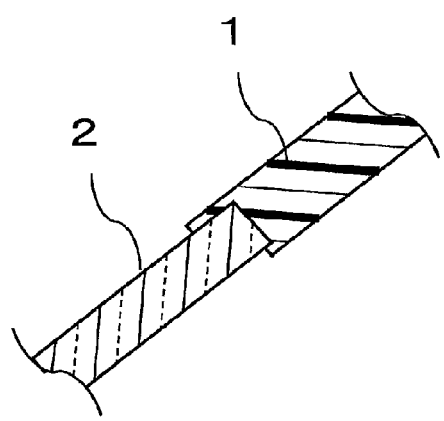
FIG. 10D is another example of the enlarged view of, in the cross-sectional view along line A-A of FIG. 1, the periphery of a joined portion of the vehicle body-use resin member and the window member.

The resin member 1 and the window member 2 are joined, for example, by an adhesive. The structure of the joined portion may be a structure where as in FIG. 10A, end faces of the resin member 1 and the window member 2 are abutted against each other, or may be a structure where as in FIG. 10B, neighborhoods of both long sides of an end face of the resin member 1 are projected in a direction perpendicular to the end face and an end face of the window member 2 is fitted between the projecting portions. Also, as in FIG. 10C or FIG. 10D, the neighborhood of one long side of an end face of the resin member 1 may be projected in a direction perpendicular to the end face. In view of strength, structures of FIG. 10B to FIG. 10D are preferred, and particularly, in view of strength against impact from the outside of a vehicle, structures of FIG. 10B and FIG. 10C are preferred.

If the difference in the thermal expansion coefficient between the resin member and the window member is large, junction of the resin member and the window member may be broken, or the window member or resin member may crack. Among others, when the resin member is provided throughout the width direction of the window member as illustrated in FIG. 1, this risk is pronounced.

For this reason, the coefficient of linear thermal expansion of the resin member of the present embodiment is preferably close to the coefficient of linear thermal expansion (about $9\times10^{-6}$ °C.$^{-1}$) of the window member. Specifically, the coefficient of linear thermal expansion is preferably $80\times10^{-6}$ °C.$^{-1}$ or less, more preferably $60\times10^{-6}$ °C.$^{-1}$ or less, still more preferably $50\times10^{-6}$ °C.$^{-1}$ or less. The coefficient of linear thermal expansion above is a value measured based on Japanese Industrial Standards (JISK7140-1-2008).

The material of the resin member of the present embodiment is not particularly limited. Also, the resin serving as the material of the resin member of the present embodiment may be mixed with a filler for various purposes, for example, for enhancing the dimensional stability and heat resistance, enhancing the thermal function, e.g., imparting flame retardance, enhancing the mechanical properties such as strength or abrasion resistance, or enhancing the electric properties, magnetic properties and sound insulating properties. The shape of the filler is not limited and includes, for example, a spherical shape, a hollow shape, a granular shape, a plate-like shape, a bar shape, and a fiber shape, etc. The material of the filler is not limited as well and includes, for example, glass, an inorganic salt such as calcium carbonate, carbon, and aramid, etc.

The material of the resin member of the present embodiment includes, for example, a fiber-reinforced plastic. The fiber-reinforced plastic includes, for example, carbon fiber-reinforced plastic (CFRP), CNF (cellulose nanofiber)-reinforced plastic, glass fiber-reinforced plastic (GFRP), and aramid fiber-reinforced plastic (AFRP), etc.

As the material of the resin member of the present embodiment, a non-fiber-reinforced plastic can also be used. For example, polyvinyl chloride (PVC), ABS resin, acryl (PMMA), polyamide resin (including PA and nylon), polyacetal (POM), polybutylene terephthalate (PBT), polyethylene terephthalate (PET), polycarbonate (PC), polyphenylene sulfide (PPS), polyether ketone (PEEK), polyethersulfone (PES), polypropylene (PP), and polyethylene (PE), etc. can be used.

Two or more kinds of these may be mixed to form a polymer alloy with the purpose of enhancing the performance.

An additive may be added to the resin member of the present embodiment within a range not inhibiting the effects of the present invention, and, for example, a UV absorber or an antioxidant, etc. may be added. A processing such as coating may be applied to the resin member of the present embodiment within a range not inhibiting the effects of the present invention.

The method for manufacturing the resin member of the present embodiment is not particularly limited but includes, for example, injection molding.

Next, the widow member with a vehicle body-use resin member of the present embodiment is described. The widow member with a vehicle body-use resin member of the present embodiment has a vehicle window member and the above-described resin member mounted to the upper portion of the vehicle window member.

In the widow member with a vehicle body-use resin member of the present embodiment, the composition of the window member is not particularly limited. The window member may be, for example, a window member composed of a laminated glass or a resin-made window member. The resin constituting the resin-made window member includes polycarbonate, a composite resin of cellulose nanofiber and polycarbonate, etc.

Next, the vehicle of the present embodiment is described. The vehicle of the present embodiment is a vehicle having a window member and the above-described resin member at the upper portion of the window member. The vehicle of the present embodiment has a resin member at a relatively high position, and an in-vehicle member can be mounted to the resin member.

Various embodiments have been described hereinabove while referring to the drawings, but, of course, the present invention is not limited to these examples. It is apparent to one skilled in the art that various modification examples or correction examples can be conceived within the scope set forth in the claims, and it should be understood that these modification or correction examples also naturally belong to the technical scope of the present invention. Also, respective constituent elements in the embodiments above may be combined within a range not departing from the gist of the present invention.

This application is based on Japanese Patent Application (Patent Application No. 2019-126898) filed on Jul. 8, 2019, the contents of which are incorporated herein by way of reference.

REFERENCE SIGNS LIST

1: Vehicle body-use resin member
2: Window member
3: Sensor
4: Through hole
5: Cover glass
6: Bracket
7: Sensor box
8: Rubber member
9: Spring member
10: Antenna
11: Concave
12: Pocket
13: Spring member
14: Room mirror
15: Mirror base
16: Planar portion
17: Mirror base
100: Vehicle

The invention claimed is:

1. A vehicle body-use resin member, comprising:
a resin member configured to be disposed on an upper portion of a window member in a vehicle and having a plate shape having a thickness of 2 to 30 mm,
wherein at least one in-vehicle member is mounted on the resin member, and the resin member has a visible light transmittance of 50% or less and a deflection temperature under load of 50° ° C. or more.

2. The vehicle body-use resin member according to claim 1, wherein the resin member has a visible light transmittance of 20% or less.

3. The vehicle body-use resin member according to claim 1, wherein the resin member is configured to be positioned throughout a width direction of the window member.

4. The vehicle body-use resin member according to claim 1, wherein at least one of the in-vehicle members is a sensor, and the resin member has a through hole formed therein.

5. The vehicle body-use resin member according to claim 4, wherein the sensor is at least one of a visible light camera, an infrared camera, a radar, and a LIDAR.

6. The vehicle body-use resin member according to claim 1, wherein at least one of the in-vehicle members is an antenna, and the resin member has a concave portion configured to mount the antenna.

7. The vehicle body-use resin member according to claim 1, wherein at least one of the in-vehicle members is a mirror, and the resin member comprises a planar portion configured to mount a mirror base of the mirror.

8. The vehicle body-use resin member according to claim 1, wherein at least one of the in-vehicle members is a mirror, and a mirror base of the mirror is integrally molded with the resin member.

9. The vehicle body-use resin member according to claim 4, wherein a cover glass is provided at a vehicle exterior-side end of the through hole.

10. The vehicle body-use resin member according to claim 9, wherein the cover glass is a chalcogenide glass.

11. The vehicle body-use resin member according to claim 1, wherein the resin member has a coefficient of linear thermal expansion of $80 \times 10^{-6°}$ $C.^{-1}$ or less.

12. The vehicle body-use resin member according to claim 1, wherein the resin member includes an UV absorber and/or an antioxidant.

13. The vehicle body-use resin member according to claim 1, wherein the resin member is colored black.

14. A vehicle body-use resin member-equipped window member, comprising:
a window member; and
the vehicle body-use resin member of claim 1 disposed on the upper portion of the window member.

15. The vehicle body-use resin member-equipped window member according to claim 14, further comprising:
at least one in-vehicle member mounted to the vehicle body-use resin member.

16. A vehicle, comprising:
a window member; and
the vehicle body-use resin member of claim 1 disposed on the upper portion of the window member.

17. The vehicle according to claim 16, further comprising:
at least one in-vehicle member mounted to the vehicle body-use resin member.

18. A vehicle according to claim 16, wherein the resin member is painted with the same color as the vehicle body.

19. The vehicle body-use resin member according to claim 1, wherein the thickness is not uniform.

* * * * *